(12) United States Patent
Suh

(10) Patent No.: US 12,200,487 B2
(45) Date of Patent: Jan. 14, 2025

(54) DEVICE AND METHOD FOR SUPPORTING AUTHENTICATION MANAGEMENT IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 17/791,127

(22) PCT Filed: Jan. 5, 2021

(86) PCT No.: PCT/KR2021/000067
§ 371 (c)(1),
(2) Date: Jul. 6, 2022

(87) PCT Pub. No.: WO2021/141349
PCT Pub. Date: Jul. 15, 2021

(65) Prior Publication Data
US 2023/0059557 A1  Feb. 23, 2023

(30) Foreign Application Priority Data

Jan. 6, 2020  (KR) .......................... 10-2020-0001676

(51) Int. Cl.
*H04L 29/06*  (2006.01)
*H04L 9/32*  (2006.01)
(Continued)

(52) U.S. Cl.
CPC ............... *H04W 12/06* (2013.01); *H04L 9/32* (2013.01); *H04L 9/3273* (2013.01);
(Continued)

(58) Field of Classification Search
None
See application file for complete search history.

(56) References Cited

U.S. PATENT DOCUMENTS

| 2007/0060106 | A1  | 3/2007 | Haverinen et al. |
| 2019/0159157 | A1  | 5/2019 | Gupta |
| 2022/0110050 | A1* | 4/2022 | Won ........................ H04W 8/12 |

FOREIGN PATENT DOCUMENTS

WO  2020/160783 A1  8/2020

OTHER PUBLICATIONS

Nokia "3GPP TSG-CT WG1 Meeting #121" (Year: 2019).*
(Continued)

*Primary Examiner* — Andrew J Steinle
(74) *Attorney, Agent, or Firm* — Jefferson IP Law, LLP

(57) ABSTRACT

A method of operating a terminal in a wireless communication system is provided. The method includes transmitting a first registration request message to a network node, based on information of a first network slice, receiving an authentication command message regarding the first network slice from the network node, transmitting an authentication complete message regarding the first network slice to the network node, receiving an authentication result message regarding the first network slice from the network node, configuring a timer to have a specific timer value, if the authentication result message indicates a failure in authentication for the first network slice, and transmitting a second registration request message to the network node, based on information of a second network slice after the timer expires.

12 Claims, 7 Drawing Sheets

(51) Int. Cl.
   *H04W 12/06*   (2021.01)
   *H04W 12/61*   (2021.01)
   *H04W 60/00*   (2009.01)
   *H04W 60/04*   (2009.01)

(52) U.S. Cl.
   CPC ........... *H04W 12/61* (2021.01); *H04W 60/00* (2013.01); *H04W 60/04* (2013.01)

(56) References Cited

OTHER PUBLICATIONS

Nokia 2 "3GPP TS 24.501" (Year: 2019).*
Extended European Search Report dated May 5, 2023, issued in a European Application No. 21738418.9.
3GPP TS 24.501 V16.3.0, Dec. 19, 2019.
Nokia et al., Slice-specific authentication and authorization procedure, 3GPP TSG-CT WG1 Meeting #121, C1-198976, Nov. 15, 2019, Reno (NV), USA.
Intel, Additional abnormal cases in SNPN, 3GPP TSG-CT1 Meeting #121, C1-198730, Nov. 13, 2019, Reno, Nevada, United States.
Mediatek Inc et al., Receiving deregistration with cause #72 when registered for both 3GPP and Non-3GPP access, 3GPP TSG-CT WG1 Meeting #121, C1-198920, Nov. 14, 2019, Reno (NV), USA.
NTT Docomo et al., SoR support for different registration types, 3GPP TSG-SA2 Meeting #136, S2-1912773, Nov. 28, 2019, Reno, Nevada, USA.

* cited by examiner

DEVICE AND METHOD FOR SUPPORTING AUTHENTICATION MANAGEMENT IN WIRELESS COMMUNICATION SYSTEM

TECHNICAL FIELD

This application is a U.S. National Stage application under 35 U.S.C. § 371 of an International application number PCT/KR2021/000067, filed on Jan. 5, 2021, which is based on and claims priority of an Korean patent application number 10-2020-0001676, filed on Jan. 6, 2020, in the Korean Intellectual Property Office, the disclosure of each of which is incorporated by reference herein in its entirety.

TECHNICAL FIELD

The disclosure relates, in general, to a wireless communication system, and, in particular, to an apparatus and method for supporting authentication management in the wireless communication system.

BACKGROUND ART

To meet a demand on wireless data traffic which has been in an increasing trend after a 4th Generation (4G) communication system was commercialized, there is an ongoing effort to develop an improved 5th Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (COMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

DISCLOSURE OF INVENTION

Technical Problem

Based on the aforementioned discussion, the disclosure provides an apparatus and method for supporting authentication management in a wireless communication system.

Solution to Problem

According to various embodiments of the disclosure, a method of operating a terminal in a wireless communication system is provided. The method includes transmitting a first registration request message to a network node, based on information of a first network slice, receiving an authentication command message regarding the first network slice from the network node, transmitting an authentication complete message regarding the first network slice to the network node, receiving an authentication result message regarding the first network slice from the network node, configuring a timer to have a specific timer value, if the authentication result message indicates a failure in authentication for the first network slice, and transmitting a second registration request message to the network node, based on information of a second network slice after the timer expires.

According to various embodiments of the disclosure, a terminal in a wireless communication system is provided. The terminal includes a transmit/receive unit, and at least one processor operatively coupled to the transmit/receive unit. The at least one processor may be configured to transmit a first registration request message to a network node, based on information of a first network slice, receive an authentication command message regarding the first network slice from the network node, transmit an authentication complete message regarding the first network slice to the network node, receive an authentication result message regarding the first network slice from the network node, configure a timer to have a specific timer value, if the authentication result message indicates a failure in authentication for the first network slice, and transmit a second registration request message to the network node, based on information of a second network slice after the timer expires.

Advantageous Effects of Invention

An apparatus and method provided according to various embodiments of the disclosure may be an apparatus and method for supporting authentication management in a wireless communication system.

Advantages acquired in the disclosure are not limited to the aforementioned advantages, and other advantages not mentioned herein can be clearly understood by those skilled in the art to which the disclosure pertains from the following descriptions.

BEST MODE FOR CARRYING OUT THE INVENTION

Figure 1:
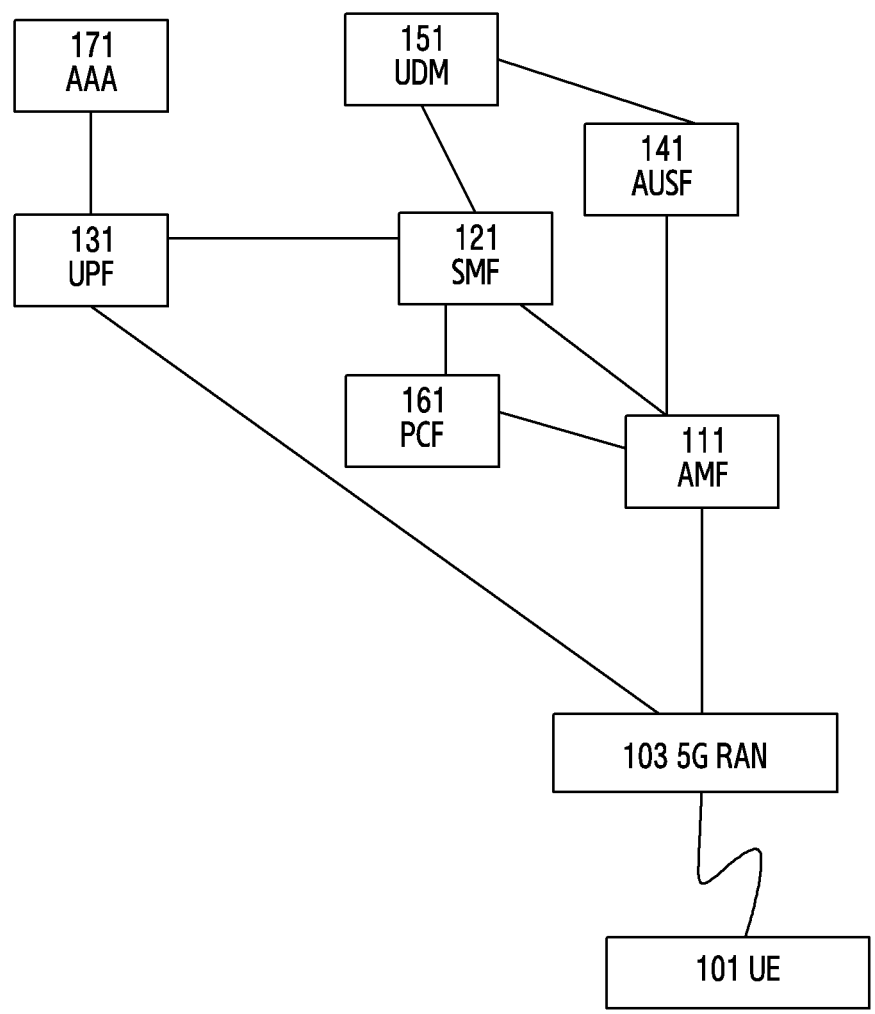
FIG. 1 illustrates a structure of a wireless communication system according to various embodiments of the disclosure.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Terms used hereinafter to refer to a signal, a channel, control information, a message, network entities, a component of a device, or the like are exemplified for convenience of explanation. Therefore, the disclosure is not limited to the terms described below, and thus other terms have the same technical meaning may also be used.

In addition, although the disclosure describes various embodiments by using terms used in some communication standards (e.g., 3$^{rd}$ Generation Partnership Project (3GPP)), this is for exemplary purposes only. Various embodiments of the disclosure may be easily modified and applied to other communication systems.

Hereinafter, the disclosure relates to an apparatus and method for supporting authentication management in a wireless communication system.

In a 5G or New Radio (NR) system, an Access and mobility Management Function (AMF) which is a management entity for managing mobility of a terminal and a Session Management Function (SMF) which is an entity for managing a session are separated. Accordingly, unlike a 4th Generation (4G) Long Term Evolution (LTE) communication system in which a Mobility Management Entity (MME) performs mobility management and session management together, the 5G or NR system has separate entities for performing mobility management and session management, which results in a change in a communication method and a communication management method between the terminal and a network entity.

In the 5G or NR system, for non-3GPP access, mobility management is performed using the AMF via a Non-3GPP Inter-Working Function (N3IWF), and session management is performed using the SMF. In addition, information related to security which is an important factor in mobility management is also processed using the AMF.

As described above, in the 4G LTE system, the MME is responsible for both the mobility management and the session management. In the 5G or NR system, a Non-Standalone Architecture (NSA) for performing communication by using the network entity of the 4G LTE system together may be supported.

The disclosure relates to an apparatus and method for authentication and registration in a wireless communication system. Specifically, the disclosure relates to a method, procedure, and apparatus for registration of a terminal when an authentication and security process is applied for a network slice under an environment subjected to the concept of the network slice which distinguishes a network entity or network to be accessed according to specific data characteristics, such as 5G communication.

According to various embodiments of the disclosure, authentication and registration may be effectively performed in a wireless communication system. According to various embodiments of the disclosure, a procedure related to registration and authentication of a terminal may be effectively performed when an authentication and security process is applied for a network slice under an environment subjected to the concept of the network slice which distinguishes a network entity or network to be accessed according to specific data characteristics, such as 5G communication.

According to various embodiments of the disclosure, a method, procedure, and apparatus for solving a time delay problem in a method and procedure of registration of a terminal and for performing communication effectively are provided when an authentication and security process is applied for a network slice under an environment subjected to the concept of the network slice which distinguishes a network entity or network to be accessed such as 5G communication.

FIG. 1 illustrates a structure of a wireless communication system according to various embodiments of the disclosure.

Specifically, FIG. 1 illustrates a structure of a network environment and a terminal for performing communication with improved communication performance in a 5G network according to various embodiments of the disclosure.

Referring to FIG. 1, a 5G or NR core network may be constructed of a Network Function (NF) such as a User Plane Function (UPF) 131, a Session Management Function (SMF) 121, an Access and mobility Management Function (AMF) 111, 5G Radio access Network (RAN) 103, a User Data Management (UDM) 151, a Policy Control Function (PCF) 161, or the like. In addition, for authentication of these entities, an entity such as an Authentication Server Function (AUSF) 141, an Authentication, Authorization and Accounting (AAA) 171, or the like may be included. A User Equipment (UE) (or a terminal) 101 may access the 5G core network through a Base Station (BS) (or a 5G radio access network (RAN)) 103.

Meanwhile, an N3 Interworking Function (N3IWF) exists for a case where the UE 101 performs communication through a non-3GPP access. When the UE 101 performs communication through the non-3GPP access, session management is controlled through the UE 101, the non-3GPP access, the N3IWF, and the SMF, and mobility management is controlled through the UE 101, the non-3GPP access, the N3IWF, and the AMF.

In the 5G or NR system, entities which perform mobility management and session management are divided into the AMF 111 and the SMF 121. Meanwhile, a standalone deployment structure in which communication is performed only with 5G or NR entities and a non-standalone deployment structure in which the 5G or NR entities are used together with a 4G entity are considered in the 5G or NR system.

Although a 5G network is assumed as a communication network based on various embodiments of the disclosure, it is also applicable to a case where the same concept is applied to other systems within a range understandable by those ordinarily skilled in the art.

Figure 2:
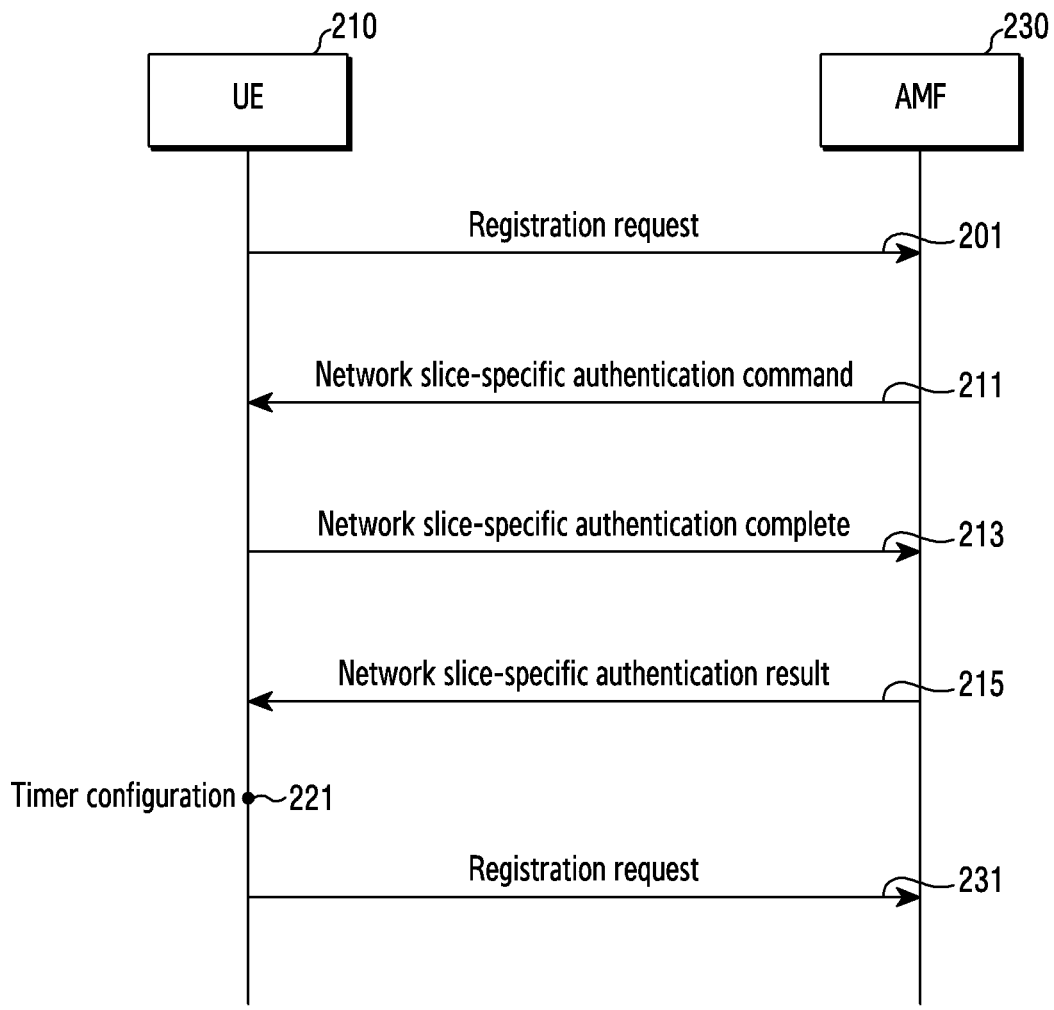
FIG. 2 illustrates a process for performing authentication and registration in a wireless communication system according to various embodiments of the disclosure.

FIG. 2 illustrates a process for performing authentication and registration in a wireless communication system according to various embodiments of the disclosure.

Specifically, FIG. 2 illustrates a process for performing authentication and registration in a 5G network environment according to various embodiments of the disclosure.

Referring to FIG. 2, in step 201, a UE 210 transmits a registration request message to an AMF 230.

In step 211, the AMF 230 transmits a network slice-specific authentication command message to the UE 210.

In step 213, the UE 210 transmits a network slice-specific authentication complete message to the AMF 230.

In step 215, the AMF 230 transmits a network slice-specific authentication result message to the UE 210.

In this case, when a failure occurs for network slice authentication, the network or the AMF 230 transmits Mobility Management (MM) cause information regarding the authentication failure to the UE 210.

Table 1 below shows a configuration of the network slice-specific authentication result message according to various embodiments of the disclosure.

TABLE 1

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | NETWORK SLICE-SPECIFIC AUTHENTICATION RESULT message identity | Message type 9.7 | M | V | 1 |
| | S-NSSAI | S-NSSAI 9.11.2.8 | M | LV | 2-5 |
| | EAP message | EAP message 9.11.2.2 | M | LV-E | 6-1502 |
| | MM cause | | | | |

Referring to Table 1, the network slice-specific authentication result message may include an MM cause Information Element (IE).

The MM cause IE may be coded as shown in Table 2 below.

According to various embodiments of the disclosure, the MM cause may include information regarding the failure occurrence of the network slice authentication or information regarding a failure cause.

Table 2 below shows a configuration of the MM cause IE according to various embodiments of the disclosure.

TABLE 2

| 8 | 7 | 6 | 5 | 4 | 3 | 2 | 1 | |
|---|---|---|---|---|---|---|---|---|
| | | | 5GMM cause IEI | | | | | octet 1 |
| | | | Cause value | | | | | octet 2 |

When the MM cause information is received together due to the authentication failure occurrence while receiving the network slice-specific authentication result message, in step 221, the UE 210 configures a timer T35xx.

In step 231, the UE 210 backs off the timer T35xx by a configured value, and transmits a registration request message to the AMF 230 after the timer T35xx expires. In this case, the UE 210 attempts registration with another network slice information.

Figure 3:
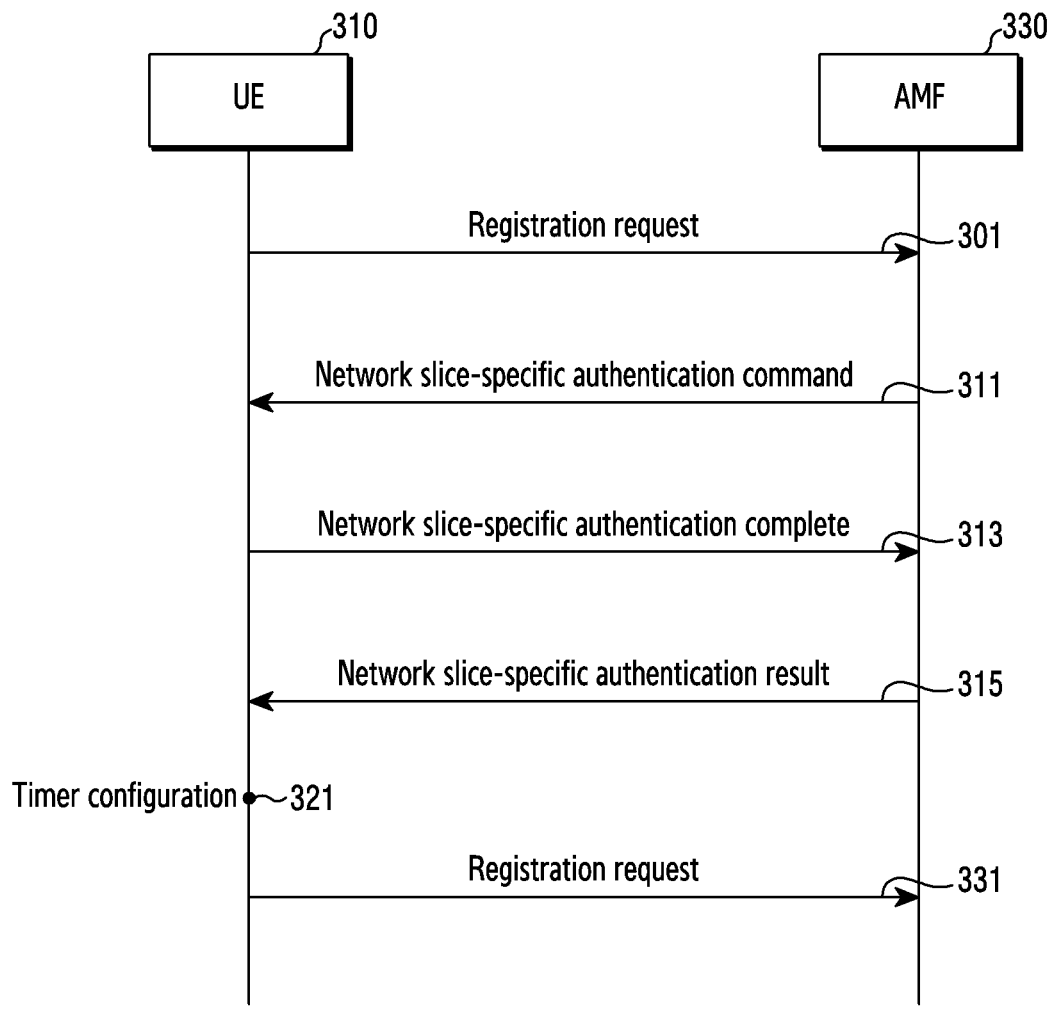
FIG. 3 illustrates a process for performing authentication and registration in a wireless communication system according to various embodiments of the disclosure.

FIG. 3 illustrates a process for performing authentication and registration in a wireless communication system according to various embodiments of the disclosure.

Specifically, FIG. 3 illustrates a process for performing authentication and registration in a 5G network environment according to various embodiments of the disclosure.

Referring to FIG. 3, in step 301, a UE 310 transmits a registration request message to an AMF 330.

In step 311, the AMF 330 transmits a network slice-specific authentication command message to the UE 310.

In step 313, the UE 310 transmits a network slice-specific authentication complete message to the AMF 330.

In step 315, the AMF 330 transmits a network slice-specific authentication result message to the UE 310.

In this case, when a failure occurs for network slice authentication, the network or the AMF 330 transmits MM cause information regarding the authentication failure and network slice information to the UE 310. According to an embodiment, the network slice information may include Single-Network Slice Selection Assistance Information (SNSSAI).

Table 3 below shows a configuration of the network slice-specific authentication result message according to various embodiments of the disclosure.

TABLE 3

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | NETWORK SLICE-SPECIFIC AUTHENTICATION RESULT message identity | Message type 9.7 | M | V | 1 |
| | S-NSSAI | S-NSSAI 9.11.2.8 | M | LV | 2-5 |
| | EAP message | EAP message 9.11.2.2 | M | LV-E | 6-1502 |
| | MM cause with SNSSAI | | | | |

Referring to Table 3, the network slice-specific authentication result message may include MM cause and network slice information IEs. According to an embodiment, the network slice information may include Single-Network Slice Selection Assistance Information (SNSSAI).

The MM cause and network slice information IEs may be coded as shown in Table 4 below.

According to various embodiments of the disclosure, the MM cause may include information regarding the failure occurrence of the network slice authentication or information regarding a failure cause.

According to an embodiment, the network slice information may include information of a network slice for which authentication has failed. Upon receiving the information of the network slice for which authentication has failed, the UE 310 may request for registration to another network slice other than the corresponding network slice.

According to another embodiment, the network slice information may include information of an authenticatable recommended network slice. Upon receiving the information of the authenticatable recommended network slice, the UE 310 may request for the registration to the network or the AMF 330 by using information of the corresponding network slice.

Table 4 below shows a configuration of an MM cause with SNSSAI IE according to various embodiments of the disclosure.

TABLE 4

| 8 | 7 | 6 | 5 | 4 | 3 | 2 | 1 | |
|---|---|---|---|---|---|---|---|---|
| | | 5GMM cause with NSSAI IEI | | | | | | octet 1 |
| | | | Cause value | | | | | octet 2 |
| | | | SST | | | | | |
| | | | SSD | | | | | |

Referring to Table 4, information on the corresponding network slice may be transferred by using Slice/Service Type (SST) and Slice Differentiator (SD) information.

When the MM cause and the network slice information are received together due to the authentication failure occurrence while receiving the network slice-specific authentication result message, in step 321, the UE 310 configures a timer T35xx.

In step 331, the UE 310 backs off the timer T35xx by a configured value, and transmits a registration request message to the AMF 330 after the timer T35xx expires. In this case, the UE 310 attempts registration with another network slice information.

Figure 4:
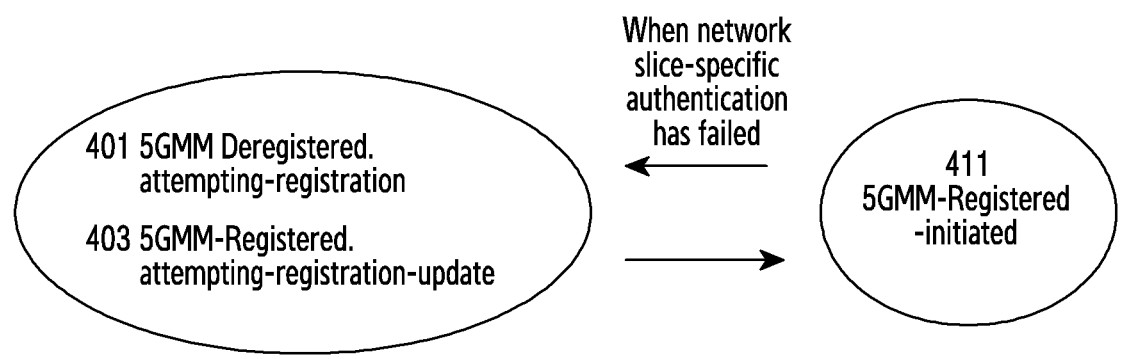
FIG. 4 illustrates a state transition and operation of a terminal for performing authentication and registration in a wireless communication system according to various embodiments of the disclosure.

FIG. 4 illustrates a state transition and operation of a terminal for performing authentication and registration in a wireless communication system according to various embodiments of the disclosure.

Specifically, FIG. 4 illustrates a state transition and operation of a terminal for performing authentication and registration in a 5G network environment according to various embodiments of the disclosure.

Referring to FIG. 4, before transmitting a registration request message, a UE is in a 5G Mobility Management (5GMM)-DEREGISTERED.ATTEMPTING-REGISTRATION state 401 or a 5GMM-REGISTERED.ATTEMPTING-REGISTRATION-UPDATE state 403.

When transmitting the registration request message, the UE transitions from the 5GMM-DEREGISTERED.ATTEMPTING-REGISTRATION state 401 or the 5GMM-REGISTERED.ATTEMPTING-REGISTRATION-UPDATE state 403 to an 5GMM-REGISTERED-INITIATED state 411.

However, when network slice-specific authentication has failed, the UE transitions from the 5GMM-REGISTERED-INITIATED state 411 to the 5GMM-DEREGISTERED.ATTEMPTING-REGISTRATION state 401 or the 5GMM-REGISTERED.ATTEMPTING-REGISTRATION-UPDATE state 403.

Figure 5:
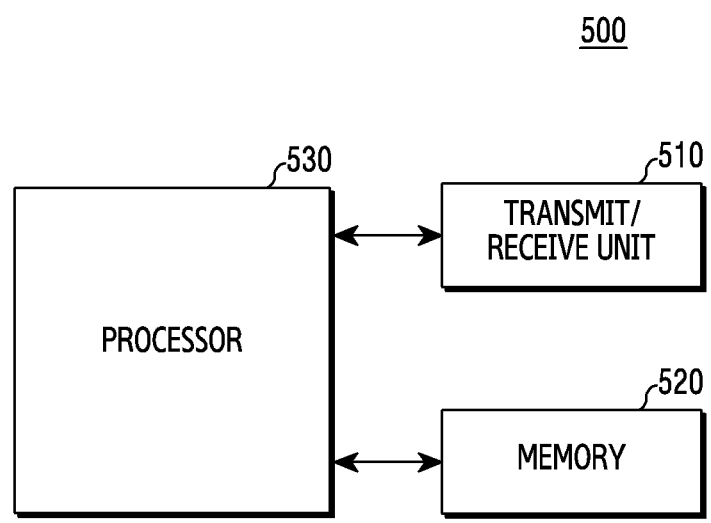
FIG. 5 illustrates a configuration of a terminal in a wireless communication system according to various embodiments of the disclosure.

FIG. 5 illustrates a configuration of a terminal in a wireless communication system according to various embodiments of the disclosure.

Referring to FIG. 5, a terminal (i.e., a UE) 500 according to various embodiment of the disclosure may include a transmit/receive unit 510, a memory 520, and a processor 530. The processor 530, transmit/receive unit 510, and memory 520 of the UE 500 may operate according to the aforementioned communication method of the UE 500. However, components of the UE 500 are not limited to the aforementioned example. For example, the UE 500 may include more or fewer components than the aforementioned components. In addition thereto, the processor 530, the transmit/receive unit 510, and the memory 520 may be implemented in the form of a single chip.

The transmit/receive unit 510 collectively refers to a receiver of the UE 500 and a transmitter of the UE 500, and may transmit/receive a signal with respect to a base station or a network entity. The signal transmitted/received with respect to the base station may include control information and data. To this end, the transmit/receive unit 510 may be constructed of an RF transmitter which up-converts and amplifies a frequency of a signal to be transmitted and an RF receiver which performs low-noise amplification on a signal to be received and down-converts a frequency of the signal. However, this is only an embodiment of the transmit/receive unit 510, and components of the transmit/receive unit 510 are not limited to the RF transmitter and the RF receiver. The transmit/receive unit 510 may include at least one transmitter/receiver or at least one transceiver. In addition, the transmit/receive unit 510 may include a wired/wireless transmit/receive unit, and may include various configurations for transmitting/receiving a signal. In addition, the transmit/receive unit 510 may receive a signal through a wireless channel and output the signal to the processor 530, and may transmit the signal output from the processor 530 through the wireless channel. In addition, the transmit/receive unit 510 may receive a communication signal and output the signal to the processor, and may transmit the signal output from the processor to a network entity through the wired/wireless network.

The memory 520 may store programs and data required in the operation of the UE 500. In addition, the memory 520 may store control information or data included in a signal obtained from the UE 500. The memory 520 may be constructed of storage media such a Read Only Memory (ROM), a Random Access Memory (RAM), a hard disk, a Compact Disc-ROM (CD-ROM), a Digital Versatile Disc (DVD), or the like, or combinations of the storage media.

The processor 530 may control a series of processes so that the UE 500 operates according to an embodiment of the disclosure as described above. The processor 530 may include at least one processors. For example, the processor 530 may include a Communication Processor (CP) for controlling communication and an Application Processor (AP) for controlling a higher layer such as an application program or the like.

Figure 6:
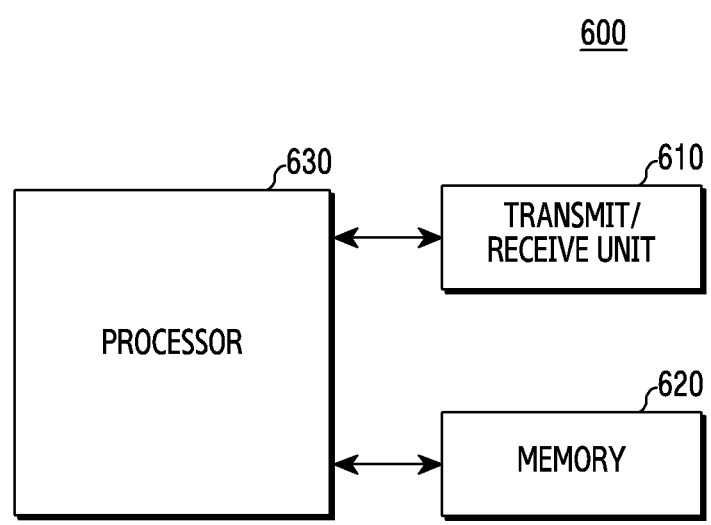
FIG. 6 illustrates a structure of a network entity in a wireless communication system according to various embodiments of the disclosure.

FIG. 6 illustrates a structure of a network entity in a wireless communication system according to various embodiments of the disclosure.

Referring to FIG. 5, a network entity 600 according to various embodiment of the disclosure may include a transmit/receive unit 610, a memory 620, and a processor 630.

The processor 630, transmit/receive unit 610, and memory 620 of the network entity 600 may operate according to the aforementioned communication method of the network entity 600. However, components of the network entity 600 are not limited to the aforementioned example. For example, the network entity 600 may include more or fewer components than the aforementioned components. In addition thereto, the processor 630, the transmit/receive unit 610, and the memory 620 may be implemented in the form of a single chip. The network entity 600 may include a Network Function (NF) described above, such as Access and Mobility Function (AMF), Session Management Function (SMF), Policy and Charging Function (PCF), Network Exposure Function (NEF), Unified Data Management (UDM), User Plane Function (UPF), or the like. The network entity 600 may also include a base station.

The transmit/receive unit 610 collectively refers to a receiver of the network entity 600 and a transmitter of the network entity 600, and may transmit/receive a signal with respect to a terminal or another network entity. The signal transmitted/received in this case may include control information and data. To this end, the transmit/receive unit 610 may be constructed of an RF transmitter which up-converts and amplifies a frequency of a signal to be transmitted and an RF receiver which performs low-noise amplification on a signal to be received and down-converts a frequency of the signal. However, this is only an embodiment of the transmit/receive unit 610, and components of the transmit/receive unit 610 are not limited to the RF transmitter and the RF receiver. The transmit/receive unit 610 may include at least one transmitter/receiver or at least one transceiver. The transmit/receive unit 610 may include a wired/wireless transmit/receive unit, and may include various configurations for transmitting/receiving a signal. In addition, the transmit/receive unit 610 may receive a signal through a communication channel (e.g., a wireless channel) and output the signal to the processor 630, and may transmit the signal output from the processor 630 through the wireless channel. In addition, the transmit/receive unit 610 may receive a communication signal and output the signal to the processor 630, and may transmit the signal output from the processor 630 to the UE or the network entity through the wired/wireless network.

The memory 620 may store programs and data required in the operation of the network entity 600. In addition, the memory 620 may store control information or data included in a signal obtained from the network entity 600. The memory 620 may be constructed of storage media such a ROM, a RAM, a hard disk, a CD-ROM, a DVD, or the like, or combinations of the storage media.

The processor 630 may control a series of processes so that the network entity 600 operates according to an embodiment of the disclosure as described above. The processor 630 may include at least one processors. Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

Figure 7:
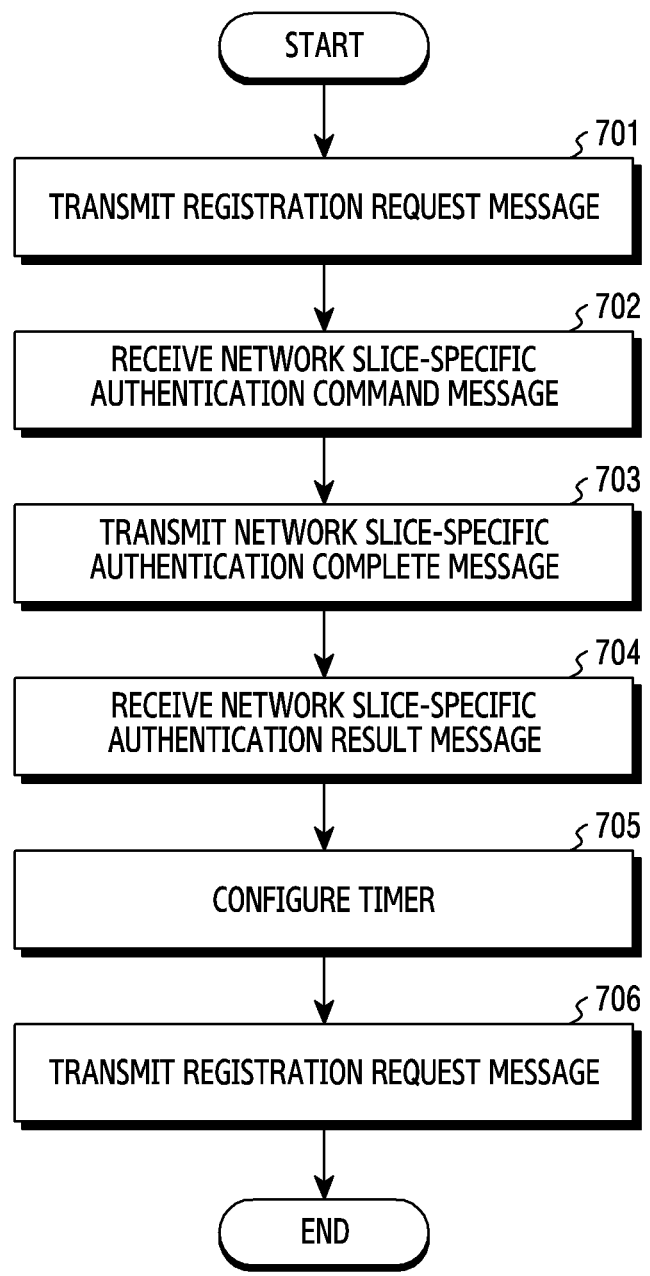
FIG. 7 illustrates a flowchart for a method of operating a terminal according to various embodiments of the disclosure.

FIG. 7 illustrates a flowchart for a method of operating a terminal according to various embodiments of the disclosure.

Referring to FIG. 7, in step 701, a terminal (i.e., a UE) transmits a registration request message to a network node. According to various embodiments of the disclosure, the network node includes an Access and mobility Management Function (AMF). According to various embodiments of the disclosure, the UE transmits the registration request message, based on information of a first network slice.

In step 702, the UE receives a network slice-specific authentication command message from the network node.

In step 703, the UE transmits a network slice-specific authentication complete message to the network node.

In step 704, the UE receives a network slice-specific authentication result message from the network node.

According to various embodiments of the disclosure, when a failure occurs for network slice-specific authentication, the network slice-specific authentication result message may include MM cause information. According to various embodiments of the disclosure, the MM cause information may include information regarding the failure occurrence of the network slice-specific authentication or information regarding a failure cause.

According to various embodiments of the disclosure, when a failure occurs for network slice-specific authentication, the network slice-specific authentication result message may include MM cause and network slice information. According to various embodiments of the disclosure, the MM cause information may include information regarding the failure occurrence of the network slice-specific authentication or information regarding a failure cause. According to various embodiments of the disclosure, the network slice information may include information of a network slice for which authentication has failed. According to various embodiments of the disclosure, the network slice information may include information of an authenticatable recommended network slice.

In step 705, the UE configures a timer. According to various embodiments of the disclosure, the UE configures the timer upon receiving a network slice-specific authentication result message including the MM cause. According to various embodiments of the disclosure, the UE configures the timer to have a specific timer value.

In step 706, the UE transmits the registration request message to the network node. According to various embodiments of the disclosure, in step 705, the UE transmits the registration request message after the timer configured in step 705 expires. According to various embodiments of the disclosure, the UE transmits the registration request message, based on information of a second network slice which is different from the first network slice.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

INDUSTRIAL APPLICABILITY

The disclosure relates, in general, to a wireless communication system, and, in particular, to an apparatus and method for supporting authentication management in the wireless communication system.

The invention claimed is:

1. A method performed by a terminal in a wireless communication system, the method comprising:
transmitting, to a network node, a first registration request message associated with a first network slice;
receiving, from the network node, an authentication command message regarding the first network slice;
transmitting, to the network node, an authentication complete message regarding the first network slice;
receiving, from the network node, an authentication result message regarding the first network slice;
in case that the authentication result message regarding the first network slice includes Mobility Management (MM) cause information, configuring a timer including a specific timer value, wherein the MM cause information includes information regarding an authentication failure occurrence of the first network slice or information regarding a failure cause; and
transmitting, to the network node, a second registration request message associated with a second network slice after the timer expires,
wherein the second network slice is different from the first network slice.

2. The method of claim 1,
wherein the authentication result message regarding the first network slice further includes
information on an authenticatable recommended network slice, and
wherein the second network slice is the recommended network slice.

3. The method of claim 2, wherein the information on the authenticatable recommended network slice includes Single-Network Slice Selection Assistance Information (SNSSAI) of the second network slice.

4. The method of claim 1, wherein the configuring of the timer including the specific time value comprises backing off the timer by a configured value.

5. The method of claim 1,
wherein, before the first registration request message is transmitted, the terminal is in a 5G Mobility Management (5GMM)-DEREGISTERED.ATTEMPTING-REGISTRATION state or a 5GMM-REGISTERED.ATTEMPTING-REGISTRATION-UPDATE state, and
wherein, after the first registration request message is transmitted, the terminal transitions from the 5GMM-DEREGISTERED.ATTEMPTING-REGISTRATION state or the 5GMM-REGISTERED.ATTEMPTING-REGISTRATION-UPDATE state to an 5GMM-REGISTERED-INITIATED state.

6. The method of claim 5, wherein, when the authentication result message regarding the first network slice indicates an authentication failure for the first network slice, the terminal transitions from the 5GMM-REGISTERED-INITIATED state to the 5GMM-DEREGISTERED.ATTEMPTING-REGISTRATION state or the 5GMM-REGISTERED.ATTEMPTING-REGISTRATION-UPDATE state.

7. A terminal in a wireless communication system, the terminal comprising:
a transceiver; and
a controller coupled to the transceiver, and configured to:
transmit, to a network node, a first registration request message associated with a first network slice,
receive, from the network node, an authentication command message regarding the first network slice,
transmit, to the network node, an authentication complete message regarding the first network slice,
receive, from the network node, an authentication result message regarding the first network slice,
in case that the authentication result message regarding the first network slice includes Mobility Management (MM) cause information, configure a timer including a specific timer value, wherein the MM cause information includes information regarding an authentication failure occurrence of the first network slice or information regarding a failure cause, and
transmit, to the network node, a second registration request message associated with a second network slice after the timer expires,
wherein the second network slice is different from the first network slice.

8. The terminal of claim 7,
wherein the authentication result message regarding the first network slice further includes
information on an authenticatable recommended network slice, and wherein the second network slice is the recommended network slice.

9. The terminal of claim 8, wherein the information on the authenticatable recommended network slice includes Single-Network Slice Selection Assistance Information (SNSSAI) of the second network slice.

10. The terminal of claim 7, wherein, in order to configure the timer including the specific timer value, the controller is configured to back off the timer by a configured value.

11. The terminal of claim 7,
   wherein, before the first registration request message is transmitted, the terminal is in a 5G Mobility Management (5GMM)-DEREGISTERED.ATTEMPTING-REGISTRATION state or a 5GMM-REGISTERED.ATTEMPTING-REGISTRATION-UPDATE state, and
   wherein, after the first registration request message is transmitted, the terminal transitions from the 5GMM-DEREGISTERED.ATTEMPTING-REGISTRATION state or the 5GMM-REGISTERED.ATTEMPTING-REGISTRATION-UPDATE state to an 5GMM-REGISTERED-INITIATED state.

12. The terminal of claim 11, wherein, when the authentication result message regarding the first network slice indicates an authentication failure for the first network slice, the terminal transitions from the 5GMM-REGISTERED-INITIATED state to the 5GMM-DEREGISTERED.ATTEMPTING-REGISTRATION state or the 5GMM-REGISTERED.ATTEMPTING-REGISTRATION-UPDATE state.

\* \* \* \* \*